May 14, 1940.  W. B. OSBORNE  2,200,851
TRANSMISSION SYNCHRONIZER
Filed Oct. 3, 1938
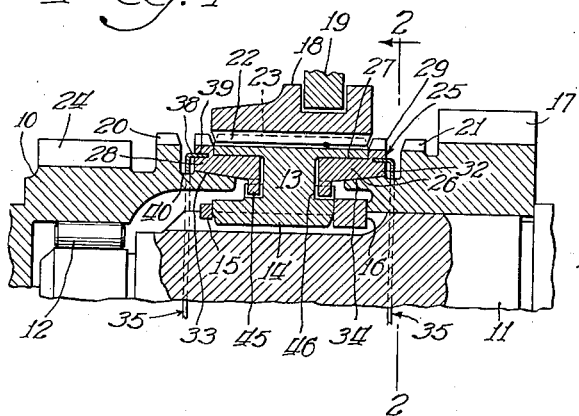
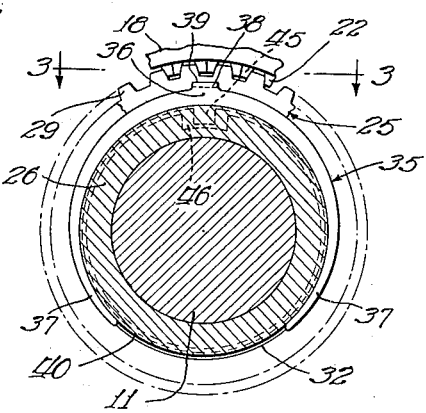
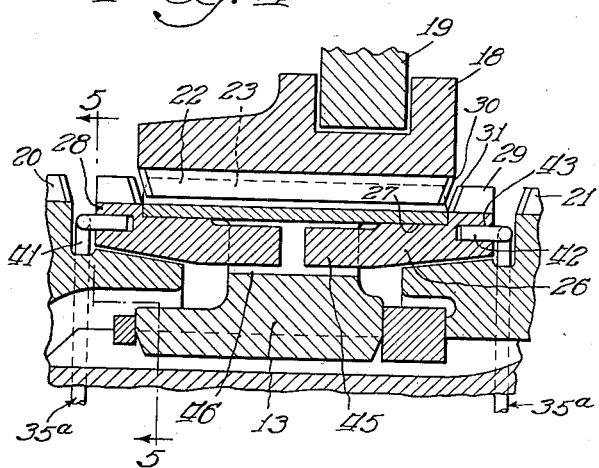
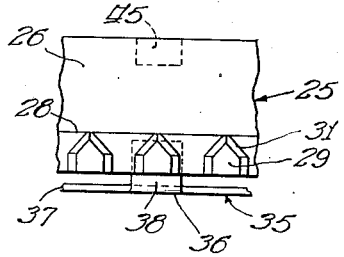
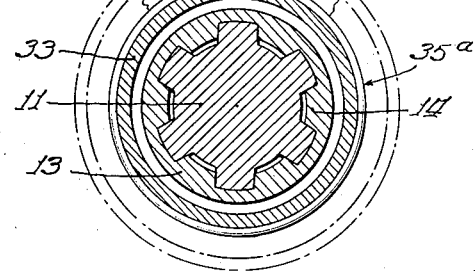
Inventor:
William B. Osborne.
By: Edward C. Gritzbaugh
Atty Patented May 14, 1940

2,200,851

UNITED STATES PATENT OFFICE 2,200,851

TRANSMISSION SYNCHRONIZER

William B. Osborne, Muncie, Ind., assignor to Borg-Warner Corporation, Chicago, Ill., a corporation of Illinois Application October 3, 1938, Serial No. 232,941

9 Claims. (Cl. 192—53)

This invention relates to synchronizing change-speed gear transmissions of the type employed, for example, in motor vehicles, wherein there is provided means for effecting synchronization of a pair or pairs of torque-transmitting members preparatory to connecting said members in positive drive engagement with each other by means of an axially movable jaw clutch element.

The invention is particularly directed to synchronizing transmissions of the type wherein the synchronizing means comprises friction clutch elements adapted to become drivingly engaged with each other in the initial stage of shifting movement, as a result of axial thrust transmitted to one of such elements from the movable jaw clutch element, and wherein there is incorporated so-called "blocker" mechanism for preventing the positive drive engagement of the members prior to the time that synchronization is effected.

An object of the invention is to completely eliminate in a synchronizer of this type, the possibility of failure resulting from the occasional passing of the movable clutch element through the blocker mechanism prior to synchronization. Such failures can occasionally occur in conventional synchronizers, where the operator's shifting stroke is quick and forceful.

The invention has as another object to simplify existing synchronizer construction, particularly by eliminating the resilient detent or "poppet" thrust connection now employed in conventional synchronizers for transmitting from the shiftable clutch element to the synchronizer rings the requisite axial thrust for effecting synchronizing engagement between the friction clutch elements.

To this end, the invention contemplates the utilization of the blocking engagement between a blocker synchronizer ring and the movable clutch element as the means for transmitting axial thrust from the latter to the former, to effect synchronization and provides specific means for initially biasing the blocker synchronizer ring in blocking position with respect to the movable clutch element, so that such blocking engagement may be relied upon for this purpose. The biasing means is in the form of a resilient ring, having a positive drive connection with the synchronizer ring and having frictional engagement with the torque-transmitting member to be synchronized therewith, so as to constantly transmit a slight amount of torque between these two members, and thereby cause the synchronizer ring to be constantly biased into its blocking position.

Other objects, the advantages and uses of the invention will become apparent after reading the following specification and claims, and after consideration of the drawing forming a part of the specification, wherein:

Fig. 1 is an axial sectional view of a synchronizing transmission embodying the invention;

Fig. 2 is a transverse sectional view thereof taken on the line 2—2 of Fig. 1;

Fig. 3 is a horizontal sectional view thereof taken on the line 3—3 of Fig. 2;

Fig. 4 is an axial sectional view of a modified form of the invention; and

Fig. 5 is a transverse sectional view taken as indicated by the line 5—5 of Fig. 4.

As illustrative of one form in which the invention may be embodied, I have shown in Fig. 1 a portion of a synchronizing transmission of the general type disclosed in the application of Samuel O. White, Serial No. 168,317, filed October 11, 1937. Such a transmission may include a torque-transmitting member 10, forming the rear end of the drive shaft of the transmission, and torque-transmitting members, including the driven shaft 11, piloted, as at 12, in the member 10, and the hub member 13 splined, as at 14, on the driven shaft 11, and secured against axial movement by retaining rings 15 and 16. Positive drive connection may be established between the torque-transmitting members 10 and 11, or between a reduction geared torque-transmitting member 17 and the member 11, by an axiallly movable jaw clutch element 18, adapted to be shifted by a shifting fork 19 into positive clutching engagement with clutch teeth 20 formed on the torque-transmitting member 10, or clutch teeth 21 formed on the torque-transmitting member 17. To this end, the movable clutch element 18 is formed with internal clutch teeth 22, in sliding splined engagement with teeth 23 forming the periphery of the hub member 13, and adapted to engage the clutch teeth 20 or 21 when moved axially.

The torque-transmitting member 17 comprises part of a reduction gear train driven from a pinion 24 on the drive shaft 10, through the medium of a conventional counter-shaft, such as is shown in the White application above referred to. Upon being moved into clutching engagement with the clutch teeth 20, the clutch member 18 will receive rotation from the drive shaft 10 and transmit it directly through the hub 13 to the driven shaft 11. Upon being moved in the opposite direction into clutching engagement with the teeth 21, the clutch member 18 will receive rotation from the torque-transmitting member 17 through the countershaft just referred to, and will transmit it through the hub member 13 to the driven shaft 11.

In order to synchronize a torque-transmitting member 10 or 17 with the hub 13, preparatory to establishing such clutching engagement, I provide a pair of synchronizer rings 25 each including a substantially cylindrical collar portion 26 rotatably floating in an annular groove 27 extending axially into the hub member 13, and a radially outwardly extending flange 28 formed with blocker teeth 29 between which the teeth 22 of the movable clutch element must pass before the clutching engagement may be had with the clutch teeth 20 or 21. The opposed ends of the teeth 22 and 29 may be chamfered, as shown at 30 and 31 respectively. The synchronizer rings 25 are provided with internal conical clutch faces 32 adapted to engage external conical clutch faces 33 and 34, respectively, formed on the torque-transmitting members 10 and 17. The rings 25 are adapted to be located and supported by the clutch faces 33 and 34. Intervening oil films prevent destructive wear as a result of such supporting arrangement.

Constant bias of the synchronizer rings 25 in their blocking positions is effected by the biasing rings 35, each of which is crescent-shaped, as shown, including the central region 36, the arcuate side arms 37, and a finger 38 bent laterally from the central region 36 and engaged in a recess 39 in the end face of the portion 28 of the synchronizer ring 25.

The arcuate arms 37 embrace an annular grooved or neck-region 40 of the torque-transmitting members 10 or 17, as the case may be, separating the friction clutch element 33 or 34 from its corresponding positive clutch element 20 or 21. The inner edges of the arms 37 are in frictional engagement with the surface of the annular grooved region 40, under resilient constricting pressure developed as a result of the rings 35 being pre-formed so as to make a fairly snug fit with the annular regions 40.

As long as relative rotation exists between a synchronizer ring 25 and its cooperating friction clutch face 33 or 34, the biasing ring 35 will exert a frictional drag against the annular surface 40, effective to bias the synchronizer ring to blocking position. In dragging against the surface 40, the arm 37, which is in a trailing position, will tend to wrap more tightly around the surface 40, and to increase the frictional drag, while the leading arm may tend to arch away from the surface. The aggregate effect, however, is the same, whether the relative rotation of the synchronizer ring with respect to its cooperating friction element is in one direction or another.

The modified form shown in Fig. 4 has been found to give good results, although it is not as satisfactory as the preferred form, for the reason that the wrapping tendency is more pronounced, and is manifested only when the synchronizer ring is rotating in one direction relative to the cooperating friction clutch element, being completely lacking when the relative rotation is in the other direction. In this form of the invention, the drag ring 35a is formed of spring wire. It is circular for a major portion of its length, one end being inclined on a tangent, as at 41, in order to locate the finger 42, formed on that end, radially outwardly from the radius of the ring proper. The finger 42 is received in a recess 43 in the synchronizer ring.

As a result of the constant biasing of the synchronizer ring in blocking position, the internal teeth 22 of the movable clutch element will, when the latter is moved in the initial stage of shifting movement, engage against the blocker teeth 29 of the synchronizer ring which is in the path of such movement, and transmit axial thrust thereto so as to urge the friction clutch faces into synchronizing engagement with each other. The speed with which synchronization is effected will vary roughly in accordance with the amount of pressure that is exerted against the shift lever.

When synchronization is reached, there will be a momentary reversal of the direction of rotation of the torque transmitting members relative to each other, causing the synchronizing ring to be oscillated toward its other limit of lost motion relative to the hub 13, and in so doing, it will reach a position wherein the internal teeth 22 of the movable clutch element 18 are in register with the spaces between the blocker teeth 29, whereupon the teeth 22, which have already commenced to move into such spaces, owing to the chamfered faces 30 and 31 of the respective sets of teeth, may, under the continuous urging pressure of the shifting member 19, slide between the teeth 29 and into engagement with the now synchronized clutch teeth 20 or 21. Since the only resistance to the axial shifting of the movable clutch element was that offered by the blocking engagement of the teeth 29 with the teeth 22, the completion of the shifting operation will be very easy. Furthermore, the relaxation of the resistance to axial advance of the movable clutch element will apprise the operator of the fact that synchronization has been reached. In fact, all that is necessary in order to shift from one gear ratio to another is to disengage the clutch, move the shifting lever to the selected position, and exert a steady light pressure thereagainst.

Lost motion connection between the synchronizer rings 25 and the hub 13 may be provided for by radially inwardly extending lugs 45 engaging in notches 46 formed in the hub 13, the notches 46 being sufficiently wider than the lugs 45 to give the desired amount of circumferential movement. It will be understood that other forms of lost motion connection may be employed, a number of equivalent constructions for this purpose being well known and in use.

I claim:

1. In a synchronizing transmission, a pair of axially aligned torque transmitting members, one of which includes a hub, and the other of which is formed with a jaw clutch element and a friction cone, a movable jaw clutch sleeve having internal teeth in an axially shiftable splined engagement with teeth on said hub, said sleeve being adapted to be moved axially into engagement with said jaw clutch element, thus to establish a positive drive connection between said members, a synchronizer ring having an internal friction face, adapted to be moved axially into frictional driving engagement with said cone, having a lost motion rotary driving connection with said hub, and including blocking teeth adapted, in one of its positions permitted by said lost motion connection, to block the axial advance of said sleeve by engagement with the internal teeth thereof, and a torque transmitting element attached to said synchronizer ring and projecting inwardly into frictional engagement with said other torque transmitting element between said jaw clutch element and said cone to transmit torque therebetween for biasing said synchronizer ring in its blocking position, whereby engagement of said blocking means by said movable clutch element during the initial stage of shifting movement, serves to transmit axial thrust from the movable clutch element to the synchronizer ring for effecting synchronizing engagement between the ring and said cone.

2. In a synchronizing transmission, a pair of torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, said synchronizer element having a lost motion connection with said one member and including blocking means adapted, in one of its positions permitted by said lost motion connection, to be engaged by said movable clutch element and to thereby block axial advance thereof, and, in another of such positions, to allow the movable clutch element to complete its axial advance to positive clutching position, and means operatively interposed between said synchronizer element and said one torque-transmitting member, attached to one of them and in embracing frictional engagement with the other, adapted to transmit torque therebetween for biasing said synchronizer element in its blocking position, whereby engagement of said blocking means by said movable clutch element during the initial stage of shifting movement, serves to transmit axial thrust from the movable clutch element to the synchronizer element for effecting synchronizing engagement between the synchronizer element and said other torque-transmitting member.

3. A synchronizing transmission as defined in claim 2, wherein said biasing means is attached to the synchronizer element and is in embracing constricting engagement with an annular region of said one torque-transmitting member.

4. A synchronizing transmission as defined in claim 2, wherein said biasing means is yoke-shaped, having a substantially centrally located finger extending into a recess in the member to which it is attached, and having opposed arc-shaped side arms in constricting, embracing, frictional engagement with an annular region of the member that it frictionally engages.

5. A synchronizing transmission as defined in claim 2, wherein said biasing means is in the form of an open ring of spring wire, one end of which is formed with a finger for engagement with the member to which it is attached, said ring extending around and in constricting engagement with the member which it frictionally engages.

6. In a synchronizing transmission, a pair of axially aligned torque-transmitting members, a movable jaw clutch element carried by one of said members and adapted to be moved into positive clutching engagement with a jaw clutch element carried by the other member, a friction clutch for synchronizing said members preparatory to such positive clutch engagement, comprising friction clutch elements drivingly associated with the respective torque-transmitting members, one of said friction clutch elements having a rotary lost motion connection with its respective torque-transmitting member and including blocking means adapted, in one position permitted by said lost motion connection, to block the path of axial advance of said movable clutch element and in another of such positions, to allow the movable clutch element to complete its axial advance to positive clutching position, and means attached to one of said friction clutch elements and extending around and in constricting frictional engagement with an annular region of the other of said friction clutch elements, adapted to transmit torque therebetween for biasing said one friction clutch element in its blocking position, whereby engagement of said blocking means by said movable clutch element during the initial stage of shifting movement, serves to transmit axial thrust from the movable clutch element to said one friction clutch element for effecting synchronizing engagement of said friction clutch.

7. In a synchronizing transmission, a pair of axially aligned torque-transmitting members, one of which includes a hub, a movable jaw clutch sleeve having internal teeth in axially shiftable splined engagement with teeth on said hub, said sleeve being adapted to be moved axially into engagement with a jaw clutch element carried by the other torque-transmitting member, thus to establish a positive drive connection, a synchronizer ring adapted to be moved axially into frictional driving engagement with said other member, having a lost motion rotary driving engagement with said hub, and including blocking teeth adapted, in one of its positions permitted by said lost motion connection, to block the axial advance of said sleeve by engagement with the internal teeth thereof, and a resilient drag means having a positive drive connection with said synchronizer ring and a constricting frictional engagement with an annular surface of said one torque-transmitting member so as to bias said synchronizer ring in blocking relation to said movable clutch element, whereby engagement of the latter with said blocking means during the initial stage of shifting movement, serves to transmit axial thrust from the movable clutch sleeve to the synchronizer ring for effecting synchronizing engagement between the synchronizer ring and said other torque-transmitting member.

8. A synchronizing transmission as defined in claim 7, wherein said drag ring is in the form of a yoke of stamped spring sheet metal having a substantially centrally located finger bent laterally and extended into a recess in an end of said synchronizer ring, and having opposed arcuate arms in embracing relation to said annular surface of the one torque-transmitting member.

9. A synchronizing transmission as defined in claim 7, wherein said drag ring is in the form of a yoke of stamped sheet spring metal, the plane of which is disposed at right angles to the axis of said torque-transmitting members, said yoke having spaced opposed arcuate arms in embracing relation to said annular surface of the one torque-transmitting member, and having an intermediately located finger bent laterally from said plane and extended into positive clutching engagement with said synchronizer ring.

WILLIAM B. OSBORNE.